United States Patent
Huettinger et al.

(10) Patent No.: US 8,115,390 B2
(45) Date of Patent: Feb. 14, 2012

(54) HIGH PRESSURE DISCHARGE LAMP

(75) Inventors: Roland Huettinger, Kaufering (DE); Stefan Juengst, Zorneding (DE); Stefan Kotter, Rotthalmuenster 2 (DE); Khanh Pham Gia, Neubiberg (DE); Steffen Walter, Oberpframmern (DE)

(73) Assignee: OSRAM AG, Munich (DE)

( * ) Notice: Subject to any disclaimer, the term of this patent is extended or adjusted under 35 U.S.C. 154(b) by 145 days.

(21) Appl. No.: 12/679,033

(22) PCT Filed: Aug. 21, 2008

(86) PCT No.: PCT/EP2008/060928
§ 371 (c)(1),
(2), (4) Date: Mar. 19, 2010

(87) PCT Pub. No.: WO2009/037063
PCT Pub. Date: Mar. 26, 2009

(65) Prior Publication Data
US 2010/0301745 A1  Dec. 2, 2010

(30) Foreign Application Priority Data
Sep. 19, 2007  (DE) .......................... 10 2007 044 629

(51) Int. Cl.
*H01J 17/18* (2006.01)
*H01J 61/36* (2006.01)
*H01J 9/00* (2006.01)

(52) U.S. Cl. ............ 313/624; 313/623; 445/29; 445/22; 445/26

(58) Field of Classification Search .......... 313/623–625; 445/22, 26–29
See application file for complete search history.

(56) References Cited

U.S. PATENT DOCUMENTS

| | | | |
|---|---|---|---|
| 3,974,410 A | | 8/1976 | Collins et al. |
| 4,780,646 A | * | 10/1988 | Lange ........................... 313/623 |
| 5,742,123 A | | 4/1998 | Nagayama |
| 5,861,714 A | | 1/1999 | Wei et al. |
| 6,020,685 A | * | 2/2000 | Wei et al. ....................... 313/625 |
| 6,066,918 A | * | 5/2000 | Suzuki et al. ................. 313/623 |
| 6,194,832 B1 | | 2/2001 | Juengst |
| 6,320,314 B1 | | 11/2001 | Torikai et al. |
| 6,362,567 B1 | * | 3/2002 | Niimi ............................. 313/623 |

FOREIGN PATENT DOCUMENTS

| | | |
|---|---|---|
| EP | 0587238 B1 | 7/2000 |
| GB | 961070 A | 6/1964 |
| JP | 2003100254 A * | 4/2003 |

OTHER PUBLICATIONS

International Search Report of PCT/EP2008/060928 mailed Dec. 12, 2008.

* cited by examiner

*Primary Examiner* — Mariceli Santiago

(57) ABSTRACT

A high-pressure discharge lamp may include a ceramic discharge vessel and a longitudinal axis, with electrodes respectively being led out from the discharge vessel by means of a feed-through via capillaries, wherein a tubular cermet part, which consists of individual layers of different composition layered axially in succession, is fitted on the capillary, each layer containing Mo and $Al_2O_3$, the proportion of Mo in the first layer facing toward the capillary being from 3 to 15 vol. % and in the last layer being from 85 to 97 vol. %, and a molybdenum cover cap, the cover cap being welded to the feed-through and the cover cap being connected to the cermet part by means of solder containing metal, and the connection between the capillary and the cermet part being established by means of high-melting glass solder or sinter-active $Al_2O_3$ powder.

13 Claims, 2 Drawing Sheets

HIGH PRESSURE DISCHARGE LAMP

RELATED APPLICATIONS

The present application is a national stage entry according to 35 U.S.C. §371 of PCT application No. PCT/EP2008/060928 filed on Aug. 21, 2008, which claims priority from German application No. 10 2007 044 629.4 filed on Sep. 19, 2007.

TECHNICAL FIELD

Various embodiments are based on a high-pressure discharge lamp.

BACKGROUND

U.S. Pat. No. 5,861,714 and U.S. Pat. No. 5,742,123 disclose a high-pressure discharge lamp in which a ceramic discharge vessel uses an axially layered cermet part for sealing at its ends.

In U.S. Pat. No. 5,742,123, a tungsten rod having a screw thread is fitted into a cermet part, the individual layers of which increase outward in their thickness. A platinum solder covers a flange on the cermet part. The number of layers is about 10. The first layer is placed directly onto the end of the discharge vessel, and the last layer is hermetically connected to the flange and the tungsten rod by means of the platinum solder.

In U.S. Pat. No. 5,861,714, the sealing between the last layer and the feed-through is produced by direct sintering and optionally assistance by means of glass solder. In both cases, the cermet parts are difficult to produce. The lifetime is unsatisfactory owing to the small number of stages and owing to the concept of sealing the feed-through in the last layer.

SUMMARY

Various embodiments provide a high-pressure discharge lamp having a ceramic discharge vessel, the sealing of which is based on the concept of an axial gradient cermet and for the first time offers a sufficient lifetime for use in general lighting.

The sealing technique in Hg high-pressure discharge lamps having a ceramic discharge vessel, particularly with an aggressive metal halide fill, still represents an unsatisfactorily resolved problem owing to the different thermal expansion coefficients of the individual components.

Above all in the region of the electrical connections, cracks are formed since the various thermal expansion coefficients when heating and re-cooling in the processes of switching on and off are so different from one another. The $Al_2O_3$ used for the discharge vessel has a typical thermal expansion coefficient of $8.3 \times 10^{-6}$ K$^{-1}$, and conventional cermet parts have a thermal expansion coefficient of from 6 to $7 \times 10^{-6}$ K$^{-1}$. A molybdenum pin has, for example, a thermal expansion coefficient of $5 \times 10^{-6}$ K$^{-1}$.

According to the invention, the sealing system is now constructed so as to use a ceramic discharge vessel with capillary ends. This is followed by a tubular cermet part with an axial gradient, which has approximately the same internal diameter and external diameter as the capillary. The cermet tube is bonded to the end of the capillary by means of a high-temperature solder, which melts at about 1500 to 1800° C. while allowing a solid interfacial connection. As an alternative, the bonding is carried out through sintering by means of a fine-grained sinter-active $Al_2O_3$ powder. A molybdenum cover cap with a central bore is placed on the cermet tube. The cap may in particular be provided with a central collar projecting axially outward.

A molybdenum pin is used at least on the outer end as the feed-through part. It typically has a diameter in the range of from 0.6 to 1.2 mm. For sealing, the molybdenum pin is welded to the cover cap. The cover cap is bonded to the cermet tube through soldering by means of a metal-based solder. Preferably, a platinum solder is used. As an alternative, a sinter-active compound may also be selected.

The problem of the abruptly changing thermal expansion coefficients of PCA (vessel or capillary), the cermet tube and the cover cap is resolved by using a cermet tube which employs a multiplicity of layers. Instead of previously at most about 10 layers, for the first time it is possible to use many more, for example 50 thin layers, typically from 100 to 200 layers. This is possible by using a multilayer technology for the production of thin films with a tape thickness of from 20 to 100 μm.

The cermet tube consists of Mo—$Al_2O_3$ layers of different composition.

A first layer of the cermet tube, which is rich in $Al_2O_3$ and low in Mo, is placed on the outer face of the end of the ceramic discharge vessel, or the capillary end. A volume ratio of from 90/10 to 98/2 between $Al_2O_3$ and Mo is typical. It is, however, also possible to use pure $Al_2O_3$ in the first layer.

The cermet tube is constructed in a graded fashion, preferably with a constant thickness of the individual layers, the proportion of Mo in the individual layers always continuing to increase outward. Finally, the cover cap is soldered onto the Mo-rich last layer typically having an Mo content of 95 vol. %. Like the first layer, this last layer is preferably made thicker than the intermediate layers, in order to improve the mechanical durability.

The graded cermet tube is produced by means of a multilayer technology. To this end, thin films with different Mo/$Al_2O_3$ ratios are used. The proportion of Mo typically ranges between 5 and 95 vol. %. Instead of the Mo, it is also possible to use another metal similar to Mo, such as W or Re. The films are subsequently stacked and laminated according to their increasing Mo content. Hollow cylinder tubes are subsequently stamped out from the films laminated into plates, and these consequently have a laminated structure along their longitudinal axis. After sintering the hollow cylinders, the graded tubes formed therefrom are applied by means of high-temperature solder or active sintering powder onto the ends of the capillaries and, at their other end, the film with a high Mo content is soldered to the cover cap. Such a structure ensures not only a quasi-continuous profile of the thermal expansion coefficient from the $Al_2O_3$ of the capillary to the molybdenum of the cover cap and the feed-through, but also secure sealing of the two end faces of the cermet. Previously, neither has such fine grading been considered necessary, even if a suitable production method could be provided for this, nor has secure bonding of the cermet tube to the other parts been obtained.

Preferably, the individual films apart from the two cover films at the first and last positions have the same thickness, which simplifies production. It is furthermore advantageous for the Mo content in the cermet to change as uniformly as possible from film to film between the first and last films, in order to avoid the formation of discontinuities or cracks. The Mo content in the first and last films should be about 5 and 95 vol. %, respectively, because the thermal expansion coefficients of these mixtures are then very close to the adjacent material Mo and $Al_2O_3$, respectively.

Producing the cermet tube by means of a multilayer technology has the advantage that the composition of the slurry for producing the individual films can be made in any desired $Mo/Al_2O_3$ ratio. Very fine gradings in the thermal expansion coefficient are thus possible, which make a large contribution to the improved sealing.

Furthermore, a thickness of the individual films (tapes) of merely 20 to 100 μm is therefore possible. A larger thickness of the individual film would, for a given grading and total number of individual films, lead to an excessive thickness of the graded tube. The thickness of the individual films in the end determines the degree of grading of the thermal expansion coefficient in the cermet tube.

A particular advantage of the overall concept is that the individual components for the sealing technique can be produced separately. The overall seal is constructed in a modular fashion.

By a sintering process at from 1600 to 2000° C., under a protective gas such as $N_2$, argon, forming gas or $H_2$, the individual films of the cermet tube are connected to one another hermetically, an intimate connection being produced between the individual layers of different composition. Cracks due to thermal stresses are therefore minimized and virtually avoided.

In a particular embodiment, the end face of the capillary is chamfered. This serves to improve the centering and retard delamination between the first cermet layer and the PCA of the discharge vessel over the lifetime. Chamfered edges are generally lower in stress than straight faces in ceramic assembly technology.

Matching this, the end face of the cermet tube facing toward the capillary is also chamfered. To this end, the first film is originally made particularly thick, typically up to 300 μm, and the chamfering is pressed into this first zone of the cermet tube. This chamfering may be produced from unsintered, graded tubes by mechanical processing.

The ceramic discharge vessel is preferably made of $Al_2O_3$, for example PCA. Conventional dopings such as MgO may be used. As an end layer, PCA may also be an integral component of the tube.

High-temperature glass solders, for example a mixture of $Al_2O_3$ and rare earth oxide, in particular $Dy_2O_3$, may be used as glass solder, see for example EP-A 587 238 for further explanation. These mixtures can be thermally loaded more than conventional solders, but for good bonding they take a longer time than is usually available for the fusing process. High-temperature glass solders consisting of a mixture of $Al_2O_3$ and $Dy_2O_3$ are preferably used, in which case the proportion of $Al_2O_3$ is from 95 to 80 vol. %, remainder $Dy_2O_3$. Typical sintering temperatures are from 1750 to 1950° C.

For the soldered connection between the PCA capillary and the graded cermet, mixtures of the raw materials $Al_2O_3$ and $Dy_2O_3$ are prepared and subsequently converted into eutectic melts at temperatures of between 1600 and 1900° C. After sintering, the solidified melts are ground into fine powders, also referred to as frits, with grain sizes d50 of between 1 and 5 μm. Pastes, which are suitable for dispensers, are prepared therefrom. For connecting PCA material and graded cermet, a thin layer of the paste is applied onto the end face of the PCA capillary and then the graded cermet is put with the $Al_2O_3$-rich side into the still moist paste and positioned. The paste is dried at temperatures of between 60 and 80° C. The bonding between the capillary and the cermet is carried out in a sintering furnace at temperatures of between 1500 and 1900° C. with a holding time of at least 5 minutes while excluding oxygen. A vacuum, or $N_2$ or Ar or $H_2$ or forming gas ($N_2/H_2$), is used as the sintering atmosphere. The particular property of this solder is that the holding temperature for assembly is much higher than the melting temperature of the AlDy solder. This offers the following advantages:

Owing to the holding temperature, which is higher than the soldering temperature, this solder has a lower viscosity than conventional solders. The solder can therefore enter very fine pores owing to capillary forces, and permanently seal them successfully.

The extended holding time, at temperatures which are higher than the soldering temperature, leads to crystallization of the solder, predominantly with $Al_2O_3$ being crystallized out. The crystallization of $Al_2O_3$ takes place by depletion of $Dy_2O_3$ in the melt. The reason is that owing to its higher mobility, this $Dy_2O_3$ can diffuse away at the $Al_2O_3$ grain boundaries, both of the PCA capillary and of the cermet. The effect of this is that the assembly after the heat treatment consists of crystalline $Al_2O_3$ with small proportions of $Dy_2O_3$ at the grain boundaries. There is therefore a continuous $Al_2O_3$ transition of the $Al_2O_3$ cermet, $Al_2O_3$ from the solder and $Al_2O_3$ from the capillary. Owing to the wide possibilities for proportions of $Al_2O_3$ relative to $Dy_2O_3$, the soldering temperature can also be adjusted in a wide spectrum of temperatures. Furthermore, the individual components for the sealing technique can now be produced separately.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
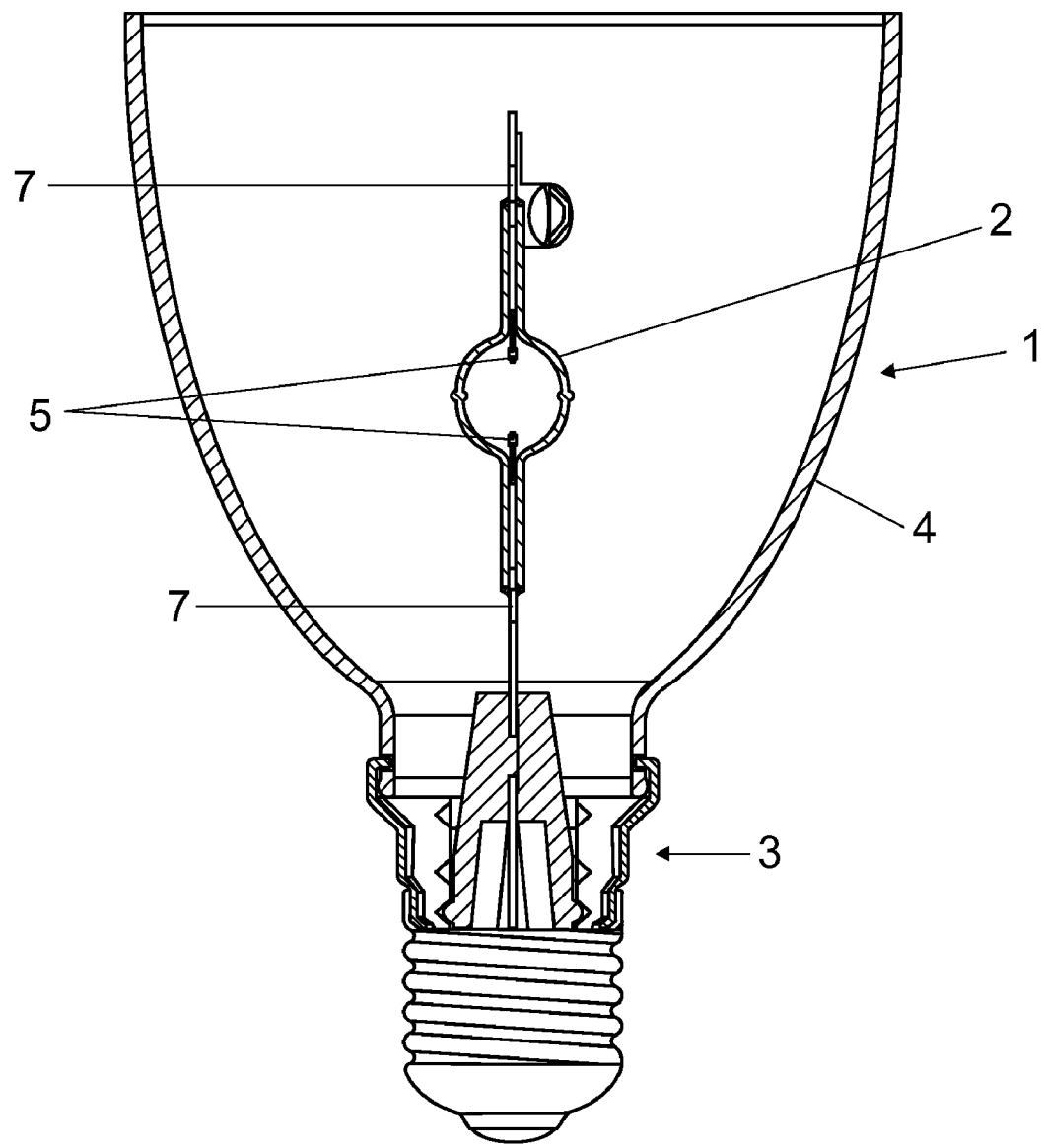
FIG. 1 shows a reflector lamp having a ceramic discharge vessel.

FIG. 1 schematically shows a reflector lamp 1. It has a ceramic discharge vessel 2, which is fastened in a base 3, and has two electrodes 5 in the discharge volume. Feed-throughs 7 project from the discharge vessel. A reflector 4, in which the discharge vessel is arranged axially, is fastened on the base. The discharge volume contains a fill, typically of metal halides and mercury.

Figure 2:
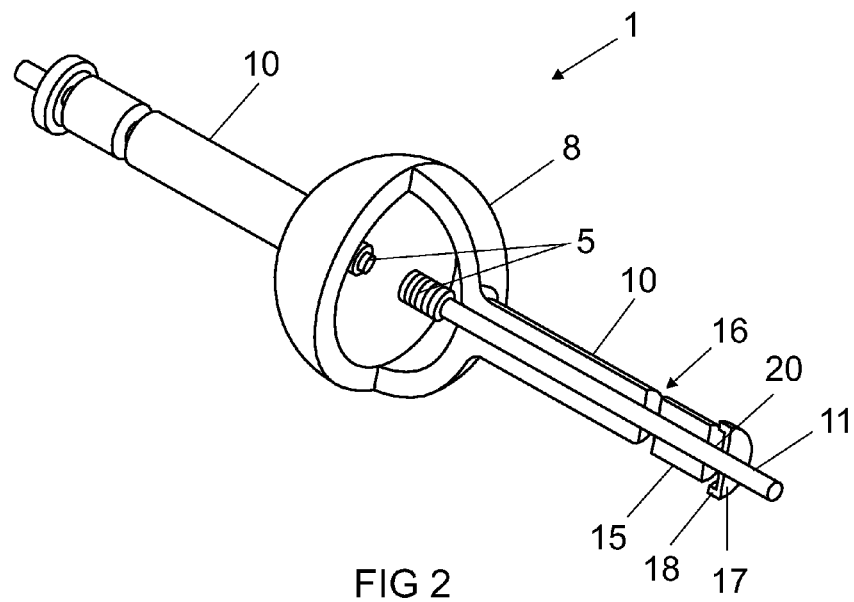
FIG. 2 shows a ceramic discharge vessel in an exploded representation, with partial cut-away.
Figure 3:
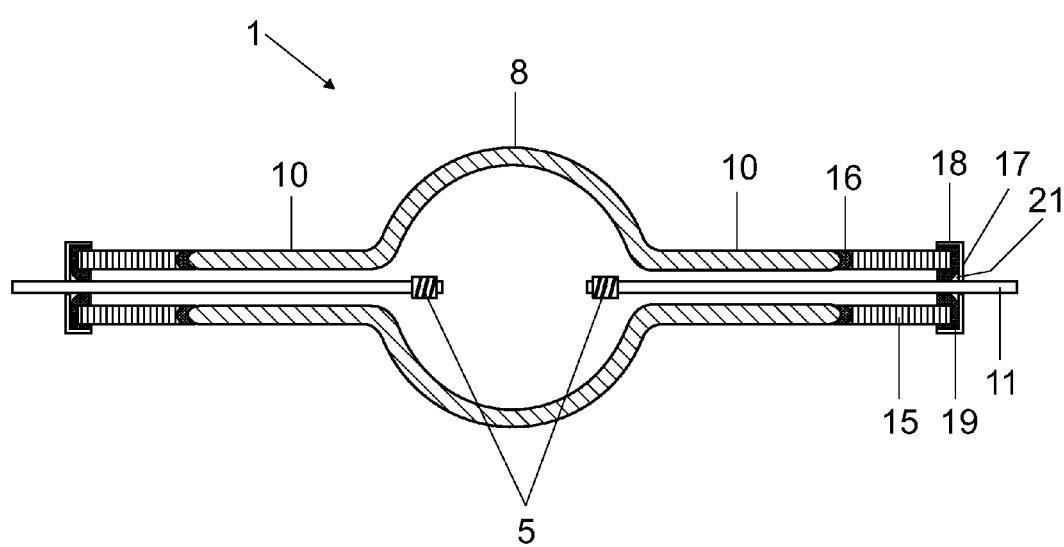
FIG. 3 shows a cross section through the discharge vessel.

FIG. 2 shows the discharge vessel 2, which is essentially produced from $Al_2O_3$ and has a bulging central part 8 in which electrodes and a fill of metal halides are accommodated. Capillaries 10 integrally adjoin the central part. Feed-throughs 11, for example consisting of Mo pins or configured in several parts as known per se, are fed into these capillaries and the shafts of the electrodes are respectively welded to them. All that is essential, however, is that the rear end of the feed-through is an Mo pin. It has a diameter of typically 1 mm. The capillary 10 is followed by a cermet tube 15 consisting of typically 50 layers of films. The films are typically each 50 μm thick, with the possible exception of the first and last films which may respectively be up to 200 to 300 μm thick. A high-temperature solder 16 is introduced between the capillary and the cermet tube. A cover cap 17 made of molybdenum with an angled-off edge 18 is applied onto the outer end of the cermet tube 15, a platinum solder 19 for sealing being introduced between the cermet tube and the cover cap. The cover cap 17 is an Mo sheet with a thickness of typically from 200 to 500 μm.

The cover cap 17 is welded to the feed-through 11, which is fed through a central bore 20 of the cover cap. For better weldability of the feed-through 11, the cover cap is preferably curved outward on the inner hole 11.

Typically, a gap with a width of from 50 to 100 μm remains between the Mo feed-through 11 and the capillary 10. The same applies for the gap between the cermet tube 15 and the Mo feed-through 11.

Typical fills for such lamps are described, for example, in EP-A 587 238.

The proportion of Mo in the first layer facing toward the capillary is from 3 to 15 vol. % and in the last layer from 85 to 97 vol. %, the remainder being $Al_2O_3$. Between them, for example, there are from 30 to 100 layers with a thickness of approximately 50 μm each. The proportion of Mo increases, preferably in a constant ratio, from the first to last layers. For secure sealing, it has been found crucial that the changes in the thermal expansion coefficient from film to film in the cermet tube and at its two ends can be kept very small. With this technology, they lie in the range of a few $10^{-8}$ $K^{-1}$.

In a particularly preferred embodiment, the radial layers are composed so that not only the thermal expansion coefficient is graded and matched well, but also the shrinkage behavior of the various layers is virtually the same. The grain size of the powders being used has proven crucial for satisfying this requirement.

For successful sealing, the different thermal expansion coefficients of the individual components $Al_2O_3$ as the material of the capillary, with the thermal expansion coefficient $8.3 \times 10^{-6}$ $K^{-1}$, and the Mo pin with the thermal expansion coefficient of $5 \times 10^{-6}$ $K^{-1}$, must be matched successfully to one another. This is done by means of the axial cermet component. A cermet tube consisting of $Mo/Al_2O_3$ is applied onto the end face of the $Al_2O_3$ capillary. The first layer is as rich as possible in $Al_2O_3$, in order to ensure the transition to the capillary. Outward, the Mo content always increases further. An Mo cap is preferably soldered onto the Mo-rich last outer layer. The advantages of this arrangement are:
- the slurry composition for producing the thin layers, which may be referred to as films, can be made in any desired $Mo/Al_2O_3$ ratio. Very fine gradings are possible, as regards the thermal expansion coefficient.
- tapes with a thickness of between 20 and 100 μm are possible for the film production. The tape thickness of the individual films determines the degree of grading in the thermal expansion coefficient in the cermet.
- the individual components of the seal can be produced separately. A modular structure is thus possible.
- a gas-tight cermet body with a graded composition is generated by the sintering. Intimate bonding takes place between the various material zones, i.e. the tapes. Cracks due to thermomechanical stresses can thereby be avoided.
- by using graded cermet structures on the ends of the capillaries, the capillaries can be made shorter. This leads to more compact discharge vessels and therefore also to lamps with a better luminous efficiency, because high temperatures can therefore also be achieved during the lamp operation.

The graded cermet is produced by means of a multilayer technology. To this end, thin films with a different $Mo/Al_2O_3$ ratio are produced, and subsequently stacked and laminated according to the increasing Mo content. Since the starting substances Mo and $Al_2O_3$ have different sintering temperatures, and therefore also exhibit different shrinkage properties, a graded multilayer stack becomes distorted during the sintering and the planar stack is finally curved. This leads in the end to delamination of individual layer composites. The trick is then to find an arrangement which exhibits a maximally uniform sintering shrinkage. This then leads to a uniform sintering shrinkage over the cross section of the graded cermet, and avoids curvature and delamination. It furthermore leads to a reduction of the intrinsic stresses in the sintered stack.

In order to achieve this, materials with different grain sizes were employed and these were mixed differently. Only in this way was it possible to adjust the target shrinkage of the individual layers, and therefore control the shrinkage of the overall graded cermet. In this context, a cermet according to Tab. 1 gives graded cermets with 18+−0.5% surface shrinkage and Tab. 2 gives graded cermets with 20+−0.5% surface shrinkage. These data relate specifically to a sintering temperature of 1900° C., over one hour in an $N_2$ atmosphere. The cermets produced in this way retain their planar structure even after sintering, and are compact. The powders used are presented in Tab. 3. In this context, Mo-rich cermet films are generally sinter-active and must therefore be produced with a higher proportion of finer powder. Low-Mo cermet films should be produced with higher proportions of coarser powder.

Tabs 1 and 2 show in the first column the layer number and the volume proportion Mo—$Al_2O_3$ (Alox). The second column shows the structure consisting of one Mo fraction and a plurality of $Al_2O_3$ fractions with different average grain diameters d50. The next columns specify the proportions of the fractions in grams. At the end, a column with the surface shrinkage S(x,y) in percent is provided.

Tab. 3 explains the various fractions in detail. Here, it is astonishing that with a suitable choice of the average diameter of the Mo powder, it is possible to use just one Mo fraction, and that the desired properties can then be achieved with only at most two $Al_2O_3$ fractions. In this context, the selection of the possible surface shrinkage is an essential guarantee of success.

It has been found that a powder with a d50 of from 1.5 to 2.6 μm should be selected as the Mo fraction. Larger values of d50 do not achieve the object. Smaller values are also unsuitable.

It has furthermore been found that as the $Al_2O_3$ fraction a selection of powders with different d50 values must be envisaged in order simultaneously to achieve the strict requirements for a matched thermal expansion coefficient and a homogeneous surface shrinkage. A set of four different powders is used for this, the average grain diameters d50 of which range from about 0.01 to more than 1.0 μm, i.e. over two orders of magnitude. The powders specified are available from commercial suppliers, for example Degussa.

The exemplary embodiments presented, with 9 layers, can readily be adapted into exemplary embodiments having more layers, for example by additionally interpolating suitably between the compositions respectively specified.

TABLE 1

| Layer Mo-Alox | Structure | Weigh-in Mo (g) | Weigh-in Ax6 (g) | Weigh-in Ax12 (g) | S (x, y) |
|---|---|---|---|---|---|
| 1/5-95 | Mo, Ax6, Ax12 | 5.1 | 16.8 | 18.9 | 18.5 |
| 2/10-90 | Mo, Ax6, Ax12 | 10.2 | 17.4 | 20.4 | 17.8 |
| 3/20-80 | Mo, Ax6, Ax12 | 20.4 | 14.9 | 16.8 | 17.7 |
| 4/40-60 | Mo, Ax6, Ax12 | 40.9 | 19.3 | 4.5 | 18.1 |
| 5/50-50 | Mo, Ax6, Ax12 | 51.1 | 16.1 | 3.8 | 17.7 |
| 6/60-40 | Mo, Ax6, Ax12 | 61.3 | 12.9 | 3.0 | 17.8 |
| 7/80-20 | Mo, Ax6, Ax12 | 81.8 | 6.4 | 1.5 | 18.0 |
| 8/90-10 | Mo, Ax6, Ax12 | 92.0 | 3.2 | 0.8 | 18.1 |
| 9/95-5 | Mo, Ax6 | 97.1 | 1.5 | | 18.0 |

TABLE 2

| Layer Mo-Alox | Structure | Weigh-in Mo (g) | Weigh-in Ax-1 (g) | Weigh-in Ax-2 (g) | S (x, y) |
|---|---|---|---|---|---|
| 1/5-95 | Mo, Ax6, Ax12 | 5.1 | 28.6 | 9.1 | 20.0 |
| 2/10-90 | Mo, Ax15, Ax12 | 10.2 | 18.7 | 17.1 | 20.0 |
| 3/20-80 | Mo, Ax15, Ax12 | 20.4 | 19.5 | 12.3 | 20.4 |
| 4/40-60 | Mo, Ax6 | 40.9 | 23.8 | | 20.1 |
| 5/50-50 | Mo, Ax15 | 51.1 | 19.6 | | 20.2 |
| 6/60-40 | Mo, Ax15, Ax20 | 61.3 | 11.9 | 4.0 | 19.7 |
| 7/80-20 | Mo, Ax15, Ax20 | 81.8 | 4.0 | 4.0 | 20.1 |
| 8/90-10 | Mo, Ax6 | 92.0 | 4.0 | | 20.1 |
| 9/95-5 | Mo, Ax6 | 97.1 | 2.0 | | 19.9 |

TABLE 3

| Material | Type | Grain size d50 in μm |
|---|---|---|
| Mo | Mo | 1.5 to 2.6 |
| $Al_2O_3$ | Ax 20 | 0.01 to 0.02 |
| $Al_2O_3$ | Ax 15 | 0.3 to 0.4 |
| $Al_2O_3$ | Ax 6 | 0.5 to 0.6 |
| $Al_2O_3$ | Ax 12 | 1.0 to 1.5 |

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A high-pressure discharge lamp, comprising:
a ceramic discharge vessel and a longitudinal axis, with electrodes respectively being led out from the discharge vessel by means of a feed-through via capillaries, wherein a tubular cermet part, which consists of individual layers of different composition layered axially in succession, is fitted on the capillary, each layer containing Mo and $Al_2O_3$, the proportion of Mo in the first layer facing toward the capillary being from 3 to 15 vol. % and in the last layer being from 85 to 97 vol. %, and a molybdenum cover cap, the cover cap being welded to the feed-through and the cover cap being connected to the cermet part by means of solder containing metal, and the connection between the capillary and the cermet part being established by means of high-melting glass solder or sinter-active $Al_2O_3$ powder.

2. The high-pressure discharge lamp as claimed in claim 1, wherein the cermet part consists of at least 5 different layers, the Mo content of which increases from the inside outward.

3. The high-pressure discharge lamp as claimed in claim 1, wherein the individual layers of the cermet part, apart from the first and last layers, are each from 20 to 100 μm thick.

4. The high-pressure discharge lamp as claimed in claim 3, wherein the layer thicknesses of these layers are each essentially equal.

5. The high-pressure discharge lamp as claimed in claim 1, wherein the outer end side of the capillary is chamfered on at least one of its inner and outer edge, and
wherein the cermet part's end side facing toward the capillary is matched thereto.

6. The high-pressure discharge lamp as claimed in claim 1, wherein the molybdenum cover cap comprises a bore for the feed-through being placed on the end of the cermet part.

7. The high-pressure discharge lamp as claimed in claim 2, wherein the cermet part consists of at least 8 different layers, the Mo content of which increases from the inside outward.

8. The high-pressure discharge lamp as claimed in claim 7, wherein the cermet part consists of at least 30 different layers, the Mo content of which increases from the inside outward.

9. A method for producing a tubular cermet part
the high-pressure discharge lamp comprising:
a ceramic discharge vessel and a longitudinal axis, with electrodes respectively being led out from the discharge vessel by means of a feed-through via capillaries,
wherein a tubular cermet part, which consists of individual layers of different composition layered axially in succession, is fitted on the capillary, each layer containing Mo and Al2O3, the proportion of Mo in the first layer facing toward the capillary being from 3 to 15 vol. % and in the last layer being from 85 to 97 vol. %, and a molybdenum cover cap, the cover cap being welded to the feed-through and the cover cap being connected to the cermet part by means of solder containing metal, and the connection between the capillary and the cermet part being established by means of high-melting glass solder or sinter-active Al2O3 powder the method comprising:
producing films, respectively formed by a cermet having the components Mo and $Al_2O_3$, so that the volume fraction of Mo is between 3 and 97%;
stacking and laminating a bundle of at least 5 films, the Mo content of which increases from one film to another, a first film having an Mo content of from 3 to 15 vol. % and a last film having an Mo content of from 85 to 97 vol. %, the layer thickness of the films, apart from the first and last layers, each being from 20 to 100 μm, so that a laminate is formed;
stamping tubular parts from the laminate, which have a gradually differing Mo content along their longitudinal axis.

10. The method as claimed in claim 9,
wherein the components Mo and $Al_2O_3$ are selected so that the shrinkage behaviors of the individual films differ from one another at most by a value of 1%.

11. The method as claimed in claim 9,
wherein a powder of a uniform fraction having an average grain diameter d50 of from 1.5 to 2.6 μm is used for the component Mo.

12. The method as claimed in claim 8,
wherein a powder which is mixed together from up to four different powder fractions is used for the component $Al_2O_3$, the different fractions having different average grain diameters d50 which lie between 0.01 μM and 1.5 μM.

13. The method as claimed in claim 9,
wherein the producing films comprises producing films with a layer thickness of from 20 to 100 μm.

* * * * *